United States Patent
Fukuda (10) Patent No.: US 9,942,446 B2
(45) Date of Patent: Apr. 10, 2018

(54) PRINT DATA GENERATION DEVICE, PRINTING APPARATUS, METHOD OF GENERATING PRINT DATA

(71) Applicant: SEIKO EPSON CORPORATION, Tokyo (JP)

(72) Inventor: Masami Fukuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/096,669

(22) Filed: Apr. 12, 2016

(65) Prior Publication Data

US 2016/0309060 A1 Oct. 20, 2016

(30) Foreign Application Priority Data

Apr. 20, 2015 (JP) ................. 2015-085675

(51) Int. Cl.
| | | |
|---|---|---|
| *H04N 1/60* | (2006.01) | |
| *G06F 15/00* | (2006.01) | |
| *G06K 1/00* | (2006.01) | |
| *G06K 15/10* | (2006.01) | |
| *B41J 2/21* | (2006.01) | |
| *H04N 1/54* | (2006.01) | |
| *H04N 1/62* | (2006.01) | |

(52) U.S. Cl.
CPC .............. *H04N 1/6025* (2013.01); *B41J 2/21* (2013.01); *G06K 15/102* (2013.01); *H04N 1/54* (2013.01); *H04N 1/6008* (2013.01); *H04N 1/6075* (2013.01); *H04N 1/62* (2013.01)

(58) Field of Classification Search
CPC .... H04N 1/6025; H04N 1/40018; H04N 1/54; H04N 1/6008; H04N 1/6075; H04N 1/62; B41J 2/21; G06K 15/102

USPC ......................................... 358/1.9, 1.15, 518
See application file for complete search history.

(56) References Cited

U.S. PATENT DOCUMENTS

2007/0009277 A1   1/2007  Shoen
2007/0201062 A1*  8/2007  Watanabe ................ H04N 1/54
                                                                358/1.9

(Continued)

FOREIGN PATENT DOCUMENTS

EP    1838085 A2    9/2007
EP    2107795 A2   10/2009

(Continued)

OTHER PUBLICATIONS

The Extended European Search Report for the corresponding European Application No. 16165418.1 dated Aug. 19, 2016.

*Primary Examiner* — Quang N Vo (57) ABSTRACT

The invention relates to a print data generation device (PC) that generates print data to be used in printing color materials onto a print medium on the basis of image data. The print data generation device includes a medium color obtainment portion that obtains color information on the print medium; a color material reduction information obtainment portion that obtains color material reduction information on the basis of predetermined color correction range information including the color information; a corrected color material level generation portion that generates a corrected color material level on the basis of the image data and the color material reduction information; and a print data generation portion that generates the print data on the basis of the corrected color material level.

13 Claims, 9 Drawing Sheets

(56) References Cited

U.S. PATENT DOCUMENTS

| | | | |
|---|---|---|---|
| 2007/0216920 A1 | 9/2007 | Watanabe | |
| 2007/0216921 A1 | 9/2007 | Watanabe | |
| 2008/0151276 A1* | 6/2008 | Mori | H04N 1/6019 |
| | | | 358/1.9 |
| 2011/0058190 A1* | 3/2011 | Yamada | H04N 1/608 |
| | | | 358/1.9 |

FOREIGN PATENT DOCUMENTS

| | | |
|---|---|---|
| JP | 2007-228316 A | 9/2007 |
| JP | 2007-282205 A | 10/2007 |
| JP | 2007-288773 A | 11/2007 |

\* cited by examiner

DOT GENERATION RATIO TABLE

| INPUT SHADE VALUE | DOT GENERATION RATIO (NUMBER OF GENERATING DOTS) | | |
|---|---|---|---|
| | SMALL DOT | MEDIUM DOT | LARGE DOT |
| 0 | s (0) | m (0) | l (0) |
| ⋮ | ⋮ | ⋮ | ⋮ |
| 158 | s (158) | m (158) | l (158) |
| 159 | s (159) | m (159) | l (159) |
| 160 | s (160) | m (160) | l (160) |
| 161 | s (161) | m (161) | l (161) |
| ⋮ | ⋮ | ⋮ | ⋮ |
| 255 | s (255) | m (255) | l (255) |

| COLOR OF PRINT MEDIUM | ☒ BLACK | ☐ WHITE | ☐ RED | ☐ BLUE | ☐ YELLOW | ☐ GREEN |
|---|---|---|---|---|---|---|
| REDUCTION DEGREE OF INK | ☐ HIGH | ☒ INTERMEDIATE | ☐ LOW | | | |

PRINT DATA GENERATION DEVICE, PRINTING APPARATUS, METHOD OF GENERATING PRINT DATA

BACKGROUND

1. Technical Field

The present invention relates to a method of generating print data to be used in printing (color materials) onto a print medium on the basis of image data, a print data generation device that generates the print data by the method, and a printing apparatus including the device.

2. Related Art

To date, printing apparatuses (ink jet printers) that print color images by ejecting inks onto fabric products (print media) such as a T-shirt have been known. In such printing apparatuses, for instance, JP-A-2007-288773 describes the following technique (print data generation device). If the background color of a color image (e.g., yellow) is the same color as a base color that is the color of the print surface of a print medium (e.g., yellow), the background color of the color image is set to be a transparent color so as not to be printed. Since the background color of the color image is not printed, the amount of an ink (such as the amount of a yellow ink) used in printing the background color decreases.

However, in the technique (print data generation device) described in JP-A-2007-288773, if the background color of the color image is the same color as the base color of the print medium, it is possible to reduce the amount of the background-color ink to be used but not possible to reduce the amounts of inks to be used in printing colors similar to the background color. That is, it is possible to reduce the amount of an ink to be used in printing an input pixel having a shade value (such as an RGB value) equivalent to that of the background color, among pixels making up the color image, but not possible to reduce the amounts of inks to be used in printing input pixels having shade values close to that of the background color. With regard to these points, the technique (print data generation device) described in JP-A-2007-288773 can be further improved for reducing the amounts of inks to be used in printing.

SUMMARY

An advantage of some aspects of the invention can be achieved as the following application examples or embodiments.

APPLICATION EXAMPLE 1

A print data generation device according to this application example generates print data to be used in printing a color material onto a print medium on the basis of image data. The print data generation device includes: a medium color obtainment portion that obtains color information on the print medium; a color material reduction information obtainment portion that obtains color material reduction information on the basis of predetermined color correction range information including the color information; a corrected color material level generation portion that generates a corrected color material level on the basis of the image data and the color material reduction information; and a print data generation portion that generates the print data on the basis of the corrected color material level.

The print data generation device in this application example obtains the color information on the print medium, and obtains the color material reduction information on the basis of the predetermined color correction range information including the color information. The print data generation device generates a corrected color material level on the basis of the image data and the color material reduction information, and generates the print data on the basis of the corrected color material level. That is, in this application example, image data whose color range includes the color of the print medium and colors similar to the color of the print medium can be corrected. This can reduce the amounts of inks to be used in printing input pixels having shade values (color information in a multidimensional display color space) close to the shade value of the color of the print medium.

APPLICATION EXAMPLE 2

The print data generation device according to the above application example further includes a storage unit that stores the color material reduction information.

In this application example, under printing conditions similar to prior printing conditions, similar processing can be omitted.

APPLICATION EXAMPLE 3

The print data generation device according to the above application example further includes a display unit that displays the print data generated by the print data generation portion.

In this application example, the degree and result of the correction can be judged without actual printing.

APPLICATION EXAMPLE 4

In the print data generation device according to the above application example, the color material reduction information obtainment portion obtains the color material reduction information on the basis of the predetermined color correction range information specified in the display unit.

This application example increases flexibility in the predetermined color correction range information and flexibility in reduction of the amount of an ink.

APPLICATION EXAMPLE 5

In the print data generation device according to the above application example, the color material reduction information obtainment portion obtains the color material reduction information on the basis of color material level reduction degree information and the predetermined color correction range information including the color information, and the color material reduction information obtainment portion obtains the color material reduction information on the basis of the color material level reduction degree information specified in the display unit.

This application example increases flexibility in the color material level reduction degree information and flexibility in reduction of the amount of an ink.

APPLICATION EXAMPLE 6

In the print data generation device according to the above application example, the color material reduction information obtainment portion obtains the color material reduction information on the basis of a transfer function for correcting a shade value in the predetermined color correction range information, as the color material level reduction degree information.

In this application example, the color material level reduction degree information is more easily obtained, and the amount of an ink is more easily reduced.

APPLICATION EXAMPLE 7

In the print data generation device according to the above application example, the display unit displays a plurality of the corrected color material levels pre-generated such that any of the plurality of the corrected color material levels is selectable.

In this application example, since any of the pre-generated corrected color material levels is selectable, the amount of an ink can be more easily reduced.

APPLICATION EXAMPLE 8

The print data generation device according to the above application example further includes a display color space conversion portion capable of interconverting the image data in a predetermined color space and image data in a space different from the predetermined color space.

In this application example, the print data generation device includes the display color space conversion portion capable of interconverting image data in a multidimensional display color space and image data in another multidimensional display color space. Thus, print data from which the advantageous effects described above are similarly obtained can be generated on the basis of the image data in the different multidimensional display color space and the color information on the print medium.

APPLICATION EXAMPLE 9

A printing apparatus according to this application example includes the print data generation device according to the above application example.

This application example can provide the printing apparatus capable of reducing the amounts of inks to be used in printing input pixels having shade values (color information in a multidimensional display color space) close to the shade value of the color of the print medium.

APPLICATION EXAMPLE 10

A method according to this application example is a method of generating print data to be used in printing a color material onto a print medium on the basis of image data. The method includes: obtaining color information on the print medium; obtaining color material reduction information on the basis of predetermined color correction range information including the color information; generating a corrected color material level on the basis of the image data and the color material reduction information; and generating the print data on the basis of the corrected color material level.

In the method of generating print data in this application example, the color information on the print medium is obtained, and the color material reduction information is obtained on the basis of the predetermined color correction range information including the color information. The print data generation device generates a corrected color material level on the basis of the image data and the color material reduction information, and generates the print data on the basis of the corrected color material level. That is, in this application example, image data whose color range includes the color of the print medium and colors similar to the color of the print medium can be corrected. Moreover, the amounts of inks to be used in printing input pixels having shade values (color information in a multidimensional display color space) close to the shade value of the color of the print medium can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes the embodiments of the invention with reference to the drawings. The embodiments of the invention described below serve as examples, and the invention is not necessarily embodied by the following embodiments. It should be noted that the figures referred to below may be illustrated in scales different from actual scales to simplify explanations.

First Embodiment

Printing Apparatus

Figure 1:
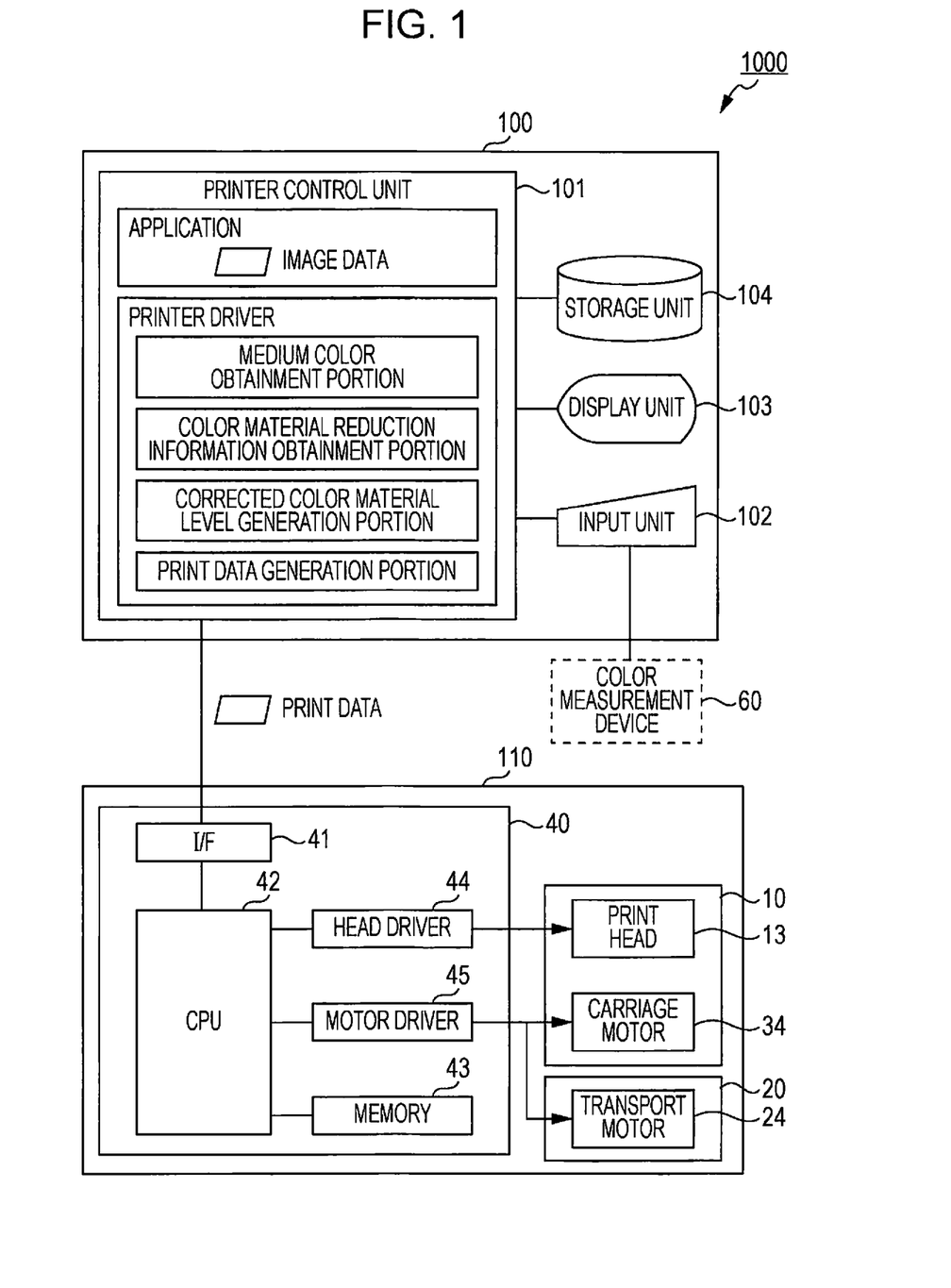
FIG. 1 is a block diagram illustrating a configuration of a printing apparatus.

FIG. 1 is a block diagram illustrating an entire configuration of a printing apparatus 1000 according to Embodiment 1.

The printing apparatus 1000 includes a personal computer 100 (hereinafter referred to as the PC 100) as "a print data generation device" and a printer 110 connected to the PC 100.

The PC 100 generates print data with which the printer 110 performs printing, on the basis of general image data obtained with a digital camera or other equipment, and transmits the print data to the printer 110 connected to the PC 100.

Upon receiving the print data from the PC 100, the printer 110 performs printing on a print medium on the basis of the print data.

Printer 110

Figure 2A:
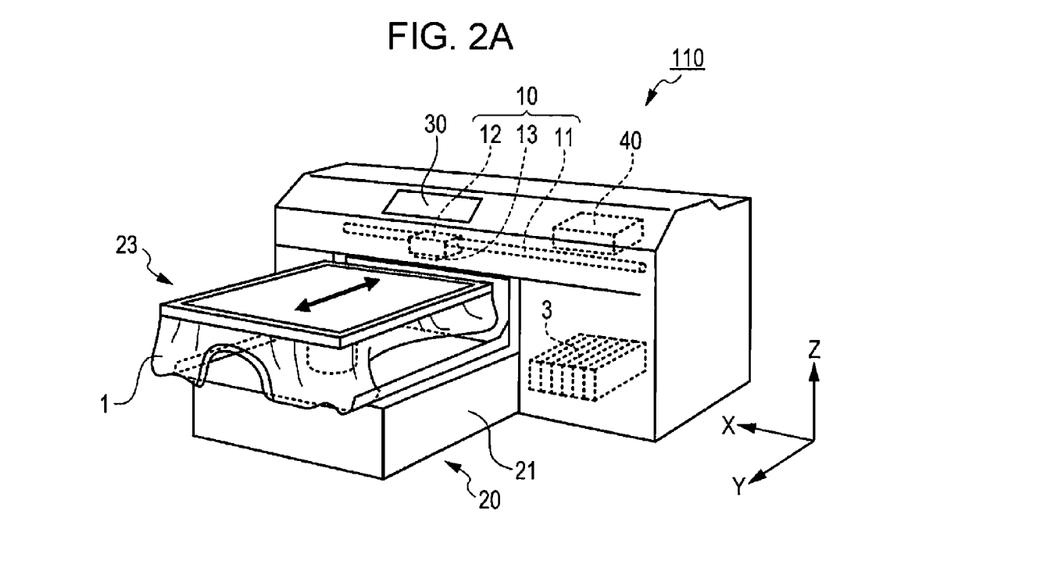
FIG. 2A is a perspective view of a printer of the printing apparatus according to Embodiment 1.
Figure 2B:
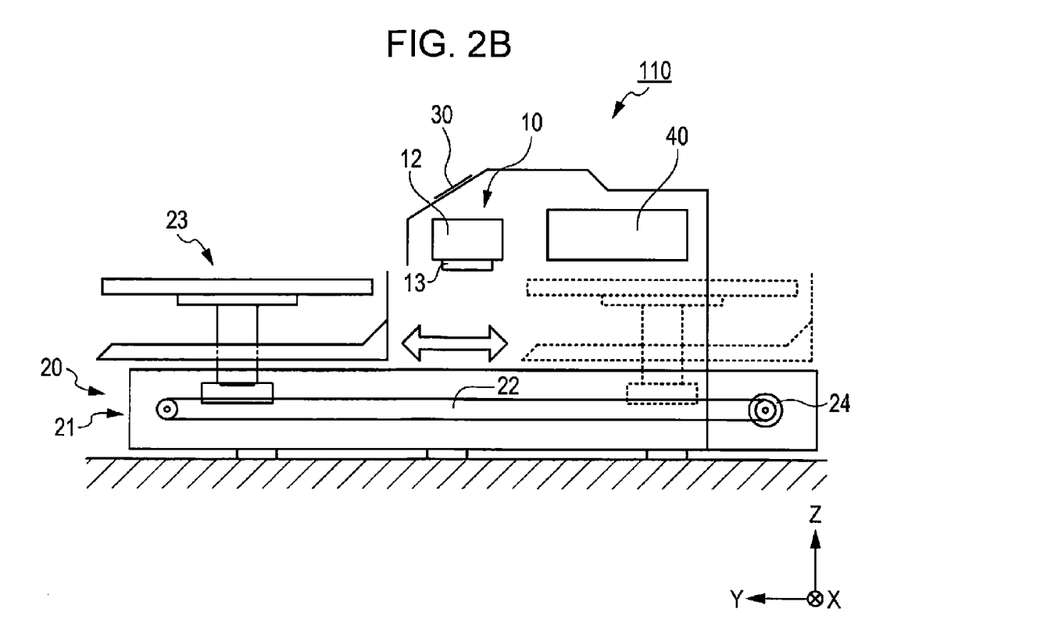
FIG. 2B is a side view illustrating an inside configuration of the printer.

FIG. 2A is a perspective view of the printer 110. FIG. 2B is a side view illustrating an internal structure of the printer 110. It should be noted that in the coordinates illustrated in the figures, the Z-axis direction is a vertical direction, the +Z direction is an upward direction, the Y-axis direction is a front/rear direction, the +Y direction is a frontward direction, the X-axis direction is a horizontal direction, +X direction is a left direction, and the X-Y plane is a horizontal plane.

The printer 110 is an ink jet textile printer that prints a desired image by ejecting inks onto a print medium (for example, cloth such as the T-shirt illustrated in FIG. 2A). It should be noted that the printer 110 may perform printing on the print medium 1 other than the cloth. As the print medium 1, paper, a film, a three-dimensional object, or various other things can be used.

The printer 110 includes a printing unit 10, a transport unit 20, an operation unit 30, and a control unit 40. The printing unit 10 performs printing on the print medium 1. The transport unit 20 transports the print medium 1. The operation unit 30 operates the printer 110. The control unit 40 controls all the operations of the printer 110.

The printing unit 10 includes a guide axis 11, a carriage 12, a print head 13, and a carriage motor 34 (see FIG. 1). The guide axis 11 extends in a direction (the illustrated X-axis direction) that intersects the direction in which the print medium 1 is transported (the illustrated Y-axis direction). The carriage 12 is supported so as to be in sliding contact with the guide axis 11. The print head 13 is supported by the carriage 12. The carriage motor 34 is a driving force for reciprocating the carriage 12 in the longitudinal direction of the guide axis 11.

The print head 13 performs printing on the print medium 1 by ejecting inks onto the print medium 1 on the basis of control by the control unit 40. The inks include a cyan ink (C), a magenta ink (M), a yellow ink (Y), a black ink (K), and a white ink (W) as the base color of an image, and these inks are examples of image forming inks. The white ink (W) as the base color of the image is used for forming the base of a region where an image having desired color development is formed without being affected by the color of the print surface of the print medium 1 (hereinafter referred to as the color of the medium).

It should be noted that the white ink (W) is used also for forming a white image as an image forming ink.

The inks are supplied to the print head 13 from an ink cartridge 3 through a tube or the like. Moreover, images include characters, figures, and symbols.

The transport unit 20 includes a base 21, a transport rail 22, a medium supporter 23, and a transport motor 24 (see FIG. 1). The base 21 moves in the front/rear direction of the printer 110 (in the Y-axis direction). The transport rail 22 extends in the longitudinal direction of the base 21 (in the Y-axis direction) inside the base 21. The medium supporter 23 supports the print medium 1. The transport motor 24 is a driving force for moving the medium supporter 23 in the longitudinal direction of the base 21 along the transport rail 22.

As FIG. 1 illustrates, the control unit 40 includes an interface 41, a CPU 42, a memory 43, a head driver 44, and a motor driver 45.

The interface 41 allows data to be transmitted and received between the PC 100 and the printer 110. The CPU 42 is an arithmetic processing unit that controls the entirety of the printer 110. The memory 43 includes storage cells such as RAM and EEPROM that make up an area where the programs of the CPU 42 are stored.

The head driver 44 drives the print head 13. The motor driver 45 drives the carriage motor 34 and the transport motor 24.

The CPU 42 controls the print head 13, the carriage motor 34, and the transport motor 24 via the head driver 44 and the motor driver 45 in accordance with the programs stored in the memory 43.

Print Data Generation Device (PC 100)

As FIG. 1 illustrates, the PC 100 includes a printer control unit 101, an input unit 102, a display unit 103, and a storage unit 104.

The printer control unit 101 includes a CPU (arithmetic unit), RAM, and ROM (not illustrated), and performs centralized control on the entirety of the printing apparatus 1000.

The input unit 102 is an information input means serving as a human interface. Specifically, the input unit 102 is, for example, a port to which a keyboard or information input equipment is connected.

The display unit 103 is an information display means (display) serving as a human interface, and can display information inputted by the input unit 102 or an image to be printed by the printer 110, on the basis of the control by the printer control unit 101.

The storage unit 104 is a rewritable storage medium such as a hard disk drive (HDD) or a memory card, and stores, for example, software operated by the PC 100 (programs run in the printer control unit 101) and image data to be printed.

The software operated in the PC 100 includes general image processing application software (hereinafter referred to as the application) and printer driver software (hereinafter referred to as the printer driver).

Moreover, as a function constituting a characteristic feature of the present embodiment, the printer control unit 101 includes a correction processing program that can correct a color material level to be used in printing, in the printer driver. By executing the correction processing program, correction can be made for reducing an ink ejection amount, using the color of the print surface of the print medium 1 (color of the medium). As its functions, the correction processing program includes a medium color obtainment portion, a color material reduction information obtainment portion, a corrected color material level generation portion, and print data generation portion. These functions will be described later.

Print Data Generation

The PC 100 as "the print data generation device" converts image data in a general RGB format obtained with a digital camera or other equipment, into print data in a CMYKW format in which the printer 110 can be driven.

The image data in the RGB format has R(r), G(g), and B(b) for each of pixels making up an image, and represents colors by RGB(r, g, b). R(r) is a shade value corresponding to the intensity of a red color component. G(g) is a shade value corresponding to the intensity of a green color component. B(b) is a shade value corresponding to the intensity of a blue color component.

The print data in the CMYKW format has C(c), M(m), Y(y), K(k), and W(w) for each of the pixels making up the image, and represents colors by CMYKW(c, m, y, k, w). C(c) is a shade value corresponding to the amount of a cyan ink (C) to be used (ejected). M(m) is a shade value corresponding to the amount of a magenta ink (M) to be used.

Y(y) is a shade value corresponding to the amount of a yellow ink (Y) to be used. K(k) is a shade value corresponding to the amount of a black ink (K) to be used. W(w) is a shade value corresponding to the amount of a white ink (W) to be used.

Figure 4:
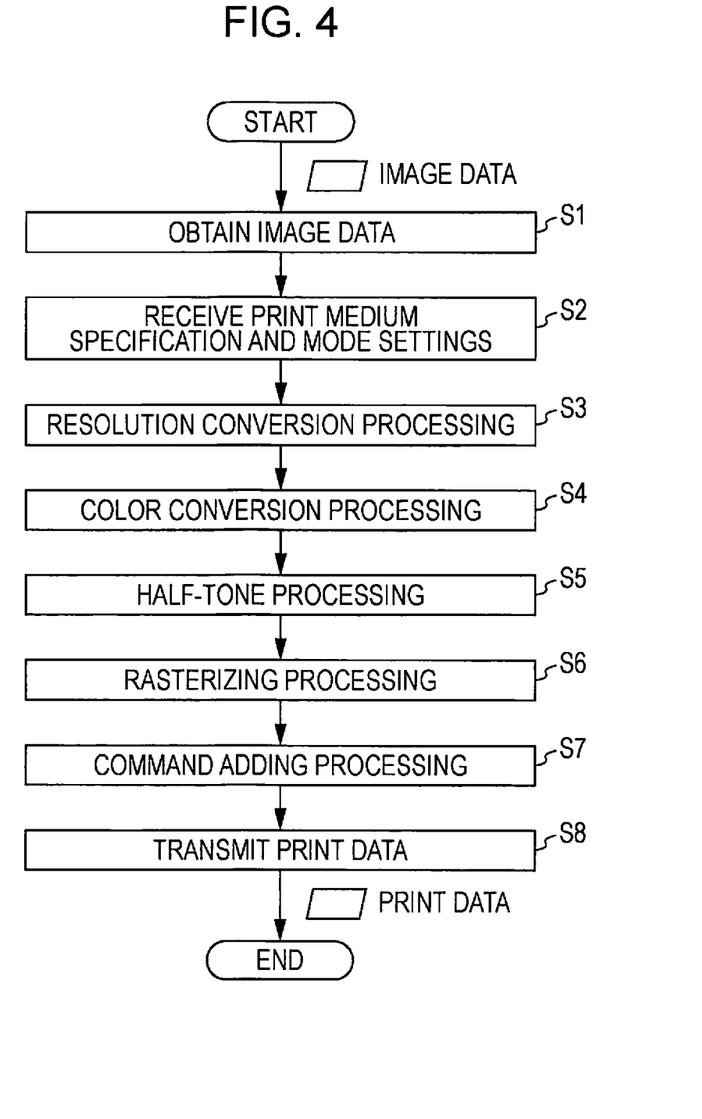
FIG. 4 is a flow chart illustrating a basic procedure of generating print data.

FIG. 4 is a flow chart illustrating a basic procedure of generating the print data.

The printer driver receives image data (such as text data or image data) from the application (step S1), and receives the specification of the print medium 1 onto which printing is to be performed and the settings of a print mode from a user (step S2). The printer driver converts the image data into print data in a format interpretable by the printer 110 (steps S3 to S7), and outputs (transmits) the print data to the printer 110 (step S8). In converting the image data from the application into the print data, the printer driver performs, for example, resolution conversion processing, color conversion processing, half-tone processing, rasterizing processing, and command adding processing.

In the resolution conversion processing (step S3), the resolution of the image data outputted from the application is converted into a resolution (printer resolution) when printing onto a piece of paper. For instance, if the printer resolution is specified as 720×720 dpi, the image data in a vector format received from the application is converted into image data in a bitmap format that has a resolution of 720×720 dpi. The pieces of data of the pixels in the image data obtained through the resolution conversion processing are composed of pixels arranged in a matrix. Each pixel has a shade value of, for example, 256 shades in an RGB color space. That is, the pieces of data of the pixels obtained through the resolution conversion processing indicate the shade values of corresponding pixels.

In the subsequent color conversion processing (step 4), the image data in the RGB format is converted into image data in the CMYKW format (data in a CMYKW-like color space). The image data in the CMYKW format corresponds to the colors of inks that the printer 110 has. Accordingly, if the printer 110 uses inks of five colors like CMYKW, the printer driver generates image data in a five-dimensional space in the CMYKW format on the basis of the image data in the RGB format. The color conversion processing is performed on the basis of a table (color conversion look-up table or LUT) in which the shade value of the image data in the RGB format is associated with the shade value of the image data in the CMYKW format. It should be noted that the pixel data obtained through the color conversion processing is image data having 256 shades in the CMYKW format, which is represented by the CMYKW-like color space.

It should be noted that even if the colors of inks used are CMYKW-like colors, the number of ink colors is not necessarily five. For instance, printing may be performed with 10-color inks. In this case, image data in a 10-dimensional space in the CMYKW format is generated in the color conversion processing.

In the subsequent half-tone processing (step S5), the data having a high number of shades (256 shades) is converted into data having the number of shades formable by the printer 110. In the half-tone processing, the data indicating 256 shades is converted into 1-bit data indicating two shades or 2-bit data indicating four shades. Image data obtained through the half-tone processing is the 1-bit data or the 2-bit data, and the pixel data of the image data indicates formation of a dot (existence and size of the dot) in each pixel.

For instance, for 2 bits (four shades), the image data is converted into image data in four levels, e.g., no formation of a dot corresponding to a dot shade value of [00]; formation of a small dot corresponding to a dot shade value of [01]; formation of a medium dot corresponding to a dot shade value of [10]; and formation of a large dot corresponding to a dot shade value of [11]. Subsequently, after a dot generation ratio is determined for each dot size, pixel data is generated so that dispersed dots are formed by the printer 110 dispersing the dots by dithering, γ correction, an error diffusion method, or other methods.

Figure 5A:
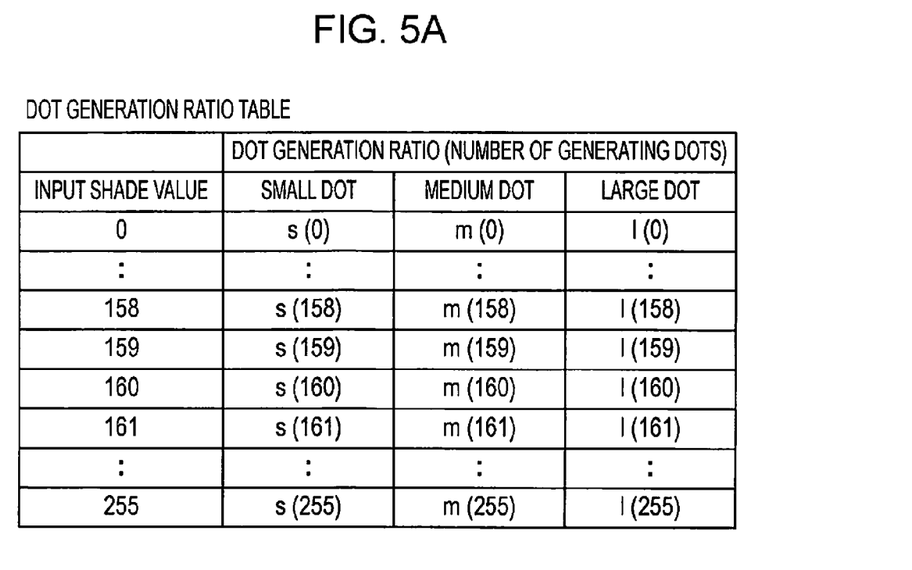
FIG. 5A is a dot generation ratio table in 2 bits (four shades).
Figure 5B:
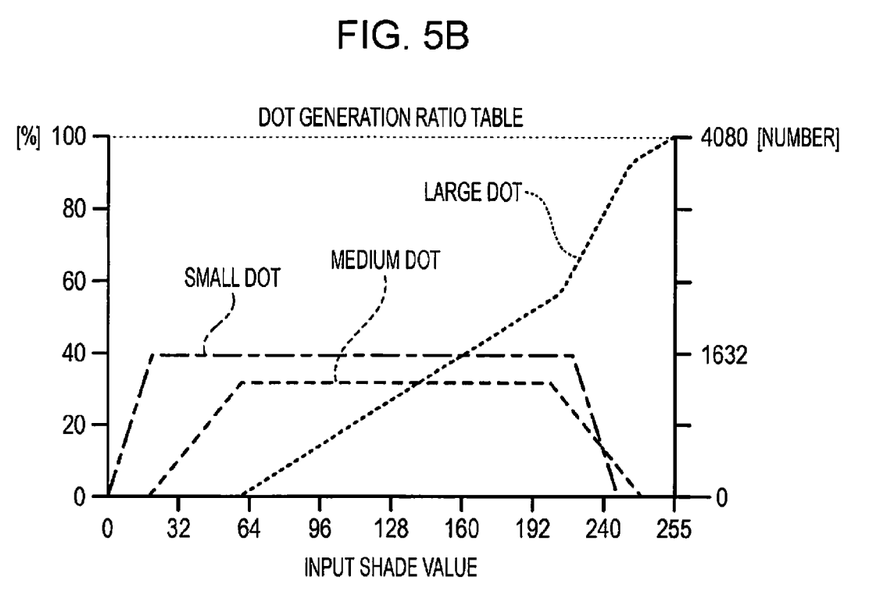
FIG. 5B is a graph derived from the dot generation ratio table.

FIG. 5A is a dot generation ratio table in 2 bits (four shades). FIG. 5B is a graph derived from the dot generation ratio table.

Figure 3:
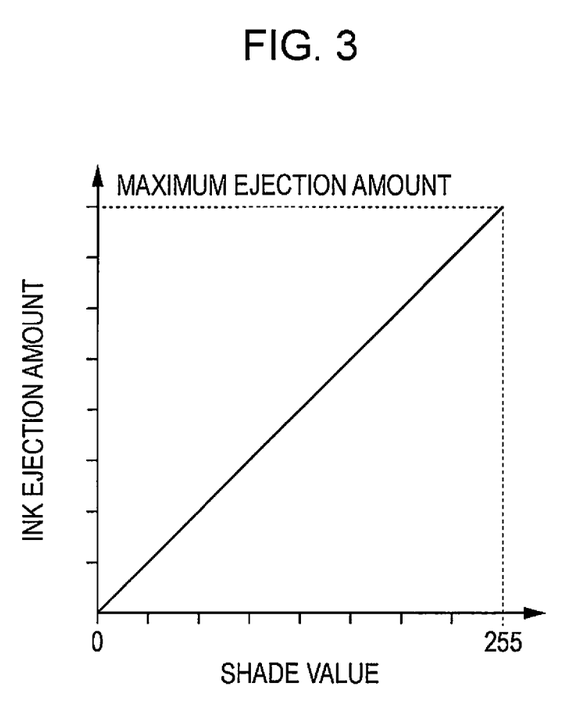
FIG. 3 is a graph showing an ideal relationship between a shade value and an ink ejection amount.

The dot generation ratio table is a table in which a shade value for each pixel included in the image data (hereinafter referred to as an input shade value) is associated with a dot generation ratio or the number of generating dots for each of the sizes of dots that the printer 110 is to form onto the print medium 1. The dot generation ratio table is stored in the memory 43 of the printer 110 for each ink color. The sum of the product of an ink ejection amount for one dot and the number of generating dots in each dot size is the total ink ejection amount. FIG. 3 illustrates an ideal relationship between the input shade value and an ink ejection amount.

In the graph illustrated in FIG. 5B, the horizontal axis represents the input shade value (0 to 255) indicated by the pixel data. The left vertical axis represents a dot generation ratio (0 to 100%). The right vertical axis represents the number of generating dots (0 to 4080). If all pixel data corresponding to a unit region in the print medium 1 indicates an input shade value i, the dot generation ratio at the input shade value i represents the ratio of pixels (e.g., n pixels) in which dots are formed, among pixels (e.g., 4080 pixels) belonging to the unit region (e.g., the ratio of the pixels is (n/4080)×100). Likewise, if all pixel data corresponding to a unit region in the print medium 1 indicates the input shade value i, the number of generating dots for the input shade value i represents the number of dots to be formed in the unit region.

In the subsequent rasterizing processing (step S6), pieces of pixel data arranged in a matrix are reordered in accordance with a dot formation order in printing. For instance, if dot formation processing is performed several times during printing, the pieces of the pixel data each corresponding to individual dot formation processing are extracted, and the pieces of the pixel data are reordered in accordance with the order of the dot formation processing. It should be noted that the order of the dot formation processing differs depending on a printing method. Thus, the rasterizing processing is performed according to the printing method.

In the subsequent command adding processing (step S7), command data appropriate for a printing method is added to the data obtained through the rasterizing processing. Examples of the command data include transport data indicating the speed at which the print medium 1 is transported.

Transmission of the print data to the printer 110 connected to the PC 100 starts printing (step S8).

Correction of Ink Ejection Amount According to Color of Medium

Figure 6A:
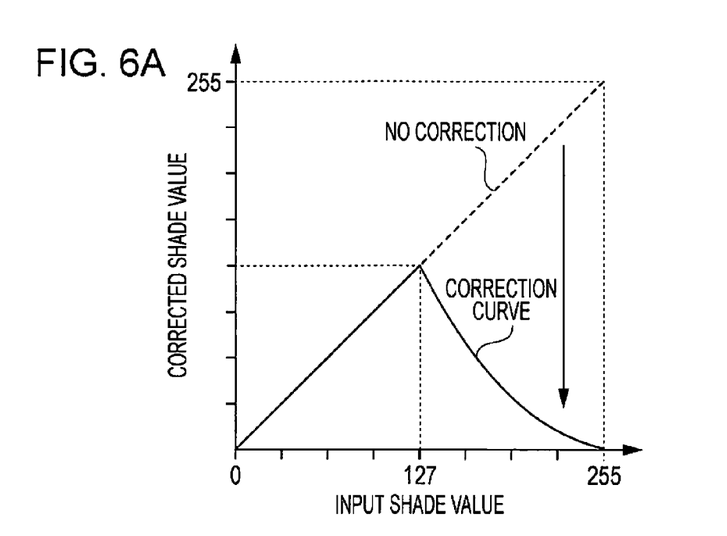
FIG. 6A is a graph illustrating a concept of correcting the ink ejection amount according to a color of a medium.
Figure 6B:
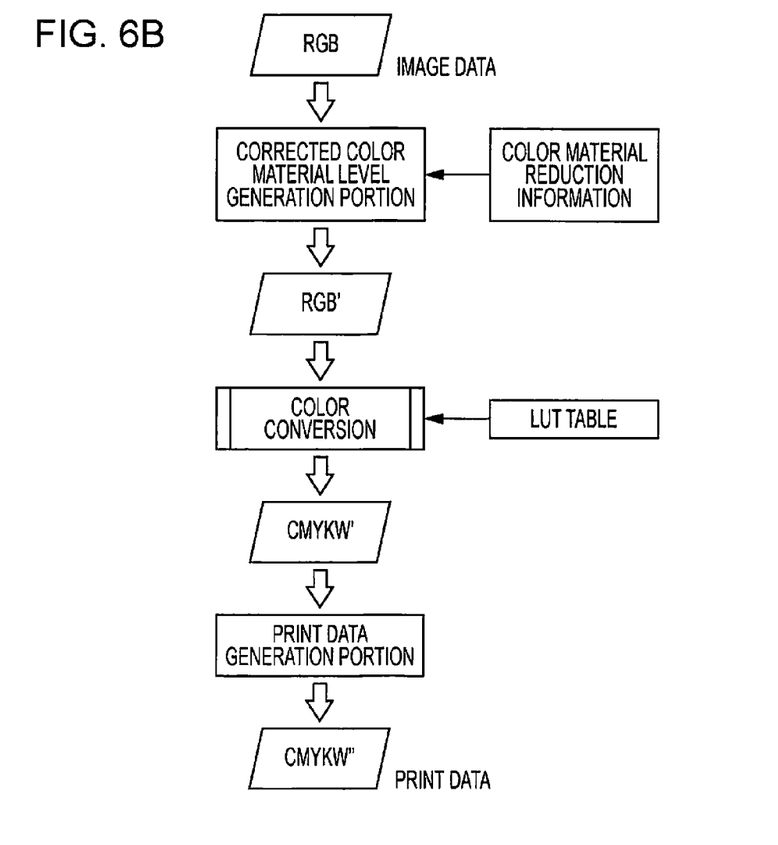
FIG. 6B is a flow chart illustrating the concept of correcting the ink ejection amount according to the color of the medium.

The graph in FIG. 6A and the flow chart in FIG. 6B illustrate a concept of correcting an ink ejection amount according to a color of a medium.

For instance, in the following description, the color of the print surface of the print medium 1 is black (RGB(r, g, b)=RGB(255, 255, 255)), and as the color of image data approaches black from gray, the ink ejection amount is reduced.

A shade range (the range of input shade values) of image data in which the ink ejection amount is to be reduced is specified. For instance, the range from a gray shade value of RGB(127, 127, 127) to a medium-color shade value of RGB(255, 255, 255) is specified. That is, in this case, a predetermined shade range in each dimension of RGB in an RGB-like color space is from 127 to 255.

For each shade range, how much the ink ejection amount is to be reduced is specified for the input shade value, using the color of the medium. For instance, the reduction can be specified as illustrated in the correction curve in FIG. 6A. FIG. 6A is a graph illustrating a relationship between the input shade value and the corrected input shade value (corrected shade value). In the correction curve in FIG. 6A, as an input shade value of 127 or above approaches 255, the corrected shade value becomes 0. That is, the correction curve represents a function for converting the input shade value into the corrected shade value. Specifically, for input shade values of 127 and above, the corrected shade value gradually becomes smaller. Thus, the ink ejection amount corresponding to the corrected shade value (corrected input shade value) gradually decreases. Similar correction is made for the predetermined shade range in each dimension of RGB.

As FIG. 6B illustrates, the image data in the RGB-like color space is corrected, and print data in the CMYKW-like color space is generated on the basis of the corrected image data. For instance, image data that changes in the range of gray to black (i.e., image data in which the input shade value changes from RGB(127, 127, 127) to RGB(255, 255, 255)) is corrected to be image data in which the input shade value changes from RGB(127, 127, 127) to RGB(0, 0, 0). The ejection amount of the black ink (K) in the CMYKW-like color space corresponding to the corrected image data changes from the ejection amount corresponding to RGB (127, 127, 127) to the ejection amount corresponding to RGB(0, 0, 0) representing no ejection of the ink.

The following describes functional portions that the printer driver (see FIG. 1) includes for performing the above correction processing. The functional portions are a medium color obtainment portion, a color material reduction obtainment portion, a corrected color material level generation portion, and a print data generation portion.

Medium Color Obtainment Portion

The medium color obtainment portion obtains the color of the print surface of the print medium 1 (the color of a medium) as medium color information in a multidimensional display color space. Specifically, the multidimensional display color space is, for example, an RGB(r, g, b) space. The medium color obtainment portion obtains the RGB(r, g, b) data of the color of the medium from a user via user interfaces that are the display unit 103 and the input unit 102. That is, if the information on the color of the medium is known, the user inputs the information on the color of the medium (such as RGB(r, g, b) data) as the medium color information via the input unit 102. If the information on the color of the print medium 1 is unknown, for instance, as FIG. 1 illustrates, a color measurement device 60 connected to the PC 100 (input unit 102) may measure the color of the print medium 1, and the obtained result may be inputted by the input unit 102 (transmitted from the color measurement unit 60 to the printer control unit 101).

Color Material Reduction Information Obtainment Portion

In the multidimensional display color space the same as that of the obtained medium color information, the color material reduction information obtainment portion determines a shade value range to be corrected for each dimension in the multidimensional display color space, as "predetermined color correction range information including the color information". Specifically, the color material reduction information obtainment portion instructs the user to specify the shade value range to be corrected, via the user interfaces.

Subsequently, the color material reduction information obtainment portion determines an association between the input shade value and the corrected shade value in each range. Specifically, the color material reduction information obtainment portion instructs the user to specify color material level reduction degree information for correcting the input shade value (color information), via the user interfaces. The color material reduction information obtainment portion generates color material reduction information on the basis of the color material level reduction degree information and the predetermined color correction range information including the color information.

There are various ways of specifying "the predetermined color correction range information including the color information" and "the color material level reduction degree information". The following describes some examples.

Figure 7:
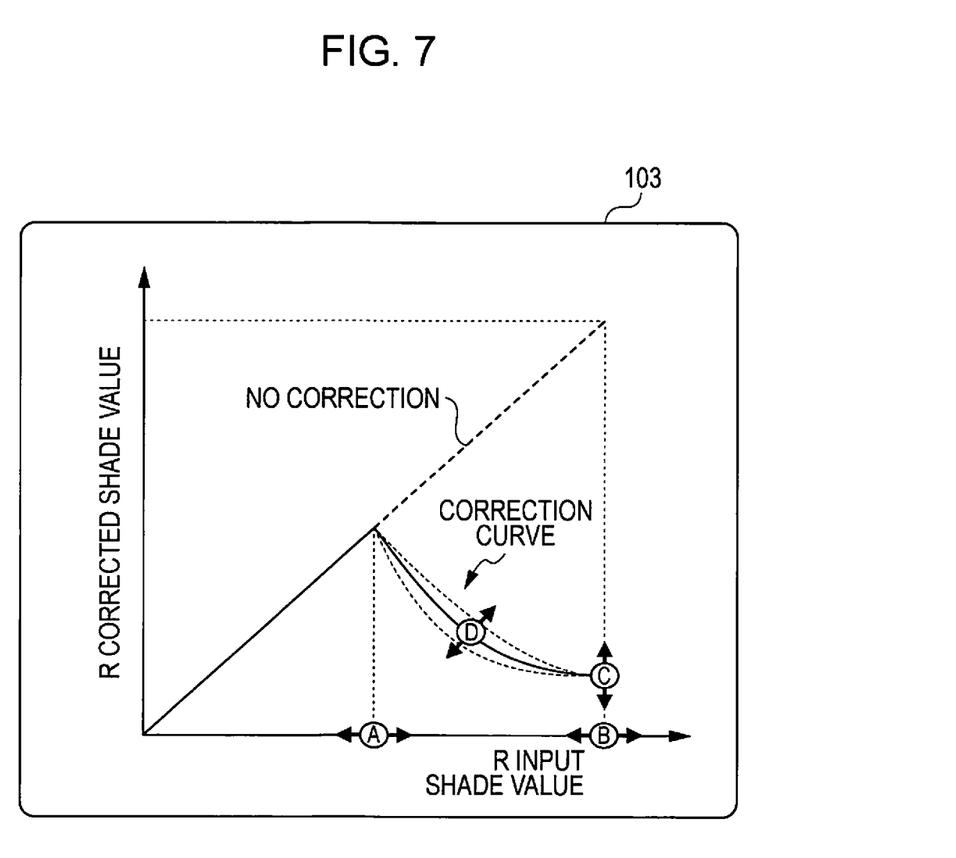
FIG. 7 is a display example of a user interface displayed in a display unit by a corrected color material level generation portion.

FIG. 7 is a display example of a user interface displayed in the display unit 103 by the color material reduction information obtainment portion.

The color material reduction information obtainment portion allows the display unit 103 to display the predetermined color correction range information in each dimension so as to be specifiable and to display the color material level reduction degree information for correcting the color information of the predetermined color correction range information so as to be specifiable. That is, the user can specify "the predetermined color correction range information including the color information" and "the color material level reduction degree information" by inputting to the input unit 102, while viewing information displayed in the display unit 103.

In the example in FIG. 7, the R(r) axis in the RGB-like color space is specified. For instance, the user can specify the positions of icons A, B, C, and D by dragging and sliding the icons with a mouse or the like of the input unit 102.

Specifically, the start point of the predetermined color correction range information including the medium color information can be specified by sliding the icon A. The end point of the predetermined color correction range information including the medium color information can be specified by sliding the icon B. It should be noted that if the end point is not specified, the end point is the medium color information.

Moreover, the corrected shade value in the medium color information can be specified by sliding the icon C. In an example of the case where the corrected shade value in the medium color information is not 0 (zero), a small amount of ink is ejected even in a region having the same color as the color of the medium, for reducing the unnaturalness of print image caused by the correction.

The correction curve of the corrected shade value from the start point to the end point of the predetermined color correction range information can be specified by sliding the icon D. For instance, as FIG. 6A illustrates, if it is necessary to decrease the corrected shade value from the start point toward the end point, using the function of the power of the input shade value, the value of the power can be intuitively changed by sliding the icon D.

Likewise, "the predetermined color correction range information including the medium color information" and "the color material level reduction degree information" are specified in each dimension in the multidimensional display color space. That is, in the RGB-like color space, the pieces of information are also specified for G(g) and B(b).

The color material reduction information obtainment portion obtains "the color material reduction information" from the specified predetermined color correction range information including the medium color information and the specified color material level reduction degree information.

In the present embodiment, the color material reduction information is generated for each of R(r), G(g), and B(b). However, after setting the color material reduction information on the color information of one color, the same color material reduction information may be set to the pieces of color information of the other colors. Moreover, in the present embodiment, the color material reduction information is obtained using both "the predetermined color correction range information including the medium color information" and "the color material level reduction degree information". However, as a way of obtaining the color material reduction information, the user may specify one of the pieces of information, and the other may be automatically specified.

Corrected Color Material Level Generation Portion

The corrected color material level generation portion generates a corrected color material level on the basis of image data and the color material reduction information. The corrected color material level represents a color material level corrected on the basis of a relationship between an input image and medium color information.

Print Data Generation Portion

On the basis of the generated corrected color material level, the print data generation portion generates print data by performing the half-tone processing or other processing.

Moreover, the print data generated on the basis of the corrected color material level may be displayed in the display unit 103 as a preview image.

In this case, for instance, the display unit 103 displays the preview image that changes as the icons A, B, C, and D are slid, in accordance with the information in FIG. 7. Thus, the user can visually recognize the magnitude of the impact of the correction.

As described above, the following advantageous effects can be obtained with the print data generation device, the printing apparatus, and the method of generating print data in the present embodiment.

The PC 100 as the print data generation device obtains color information on the print medium 1, and color material reduction information that includes predetermined color correction range information including the color information. Moreover, the PC 100 generates a corrected color material level on the basis of image data and the color material reduction information, and generates print data on the basis of the corrected color material level. That is, in the present embodiment, image data whose color range includes the color of the print medium 1 and colors similar to the color of the print medium 1 can be corrected. This can reduce the amounts of inks to be used in printing input pixels whose shade values (color information in a multidimensional display color space) are close to that of the color of the print medium 1.

Accordingly, in the present embodiment, it is possible to prevent the degradation of print quality while reducing the amounts of image forming inks to be used in printing.

Embodiment 2

The following describes a print data generation device, a printing apparatus, and a method of generating print data according to Embodiment 2. It should be noted that identical reference signs are used to designate the same structural elements as those in Embodiment 1, and overlapping explanations are omitted.

In Embodiment 1, as FIGS. 6A and 6B illustrate, an ink ejection amount is corrected (reduced) according to a corrected color material level for adjusting the corrected shade value for the input shade value in image data in the RGB-like color space. That is, the image data is corrected prior to the color conversion processing. However, the image data is not necessarily corrected prior to the color conversion processing. In Embodiment 2, the ejection amount of each ink corresponding to the CMYKW-like color space obtained through the color conversion processing is corrected. Except for this point, the methods of generating print data in Embodiments 1 and 2 are similar, and the print data generation devices and the printing apparatuses in Embodiments 1 and 2 have the same configurations.

Figure 9A:
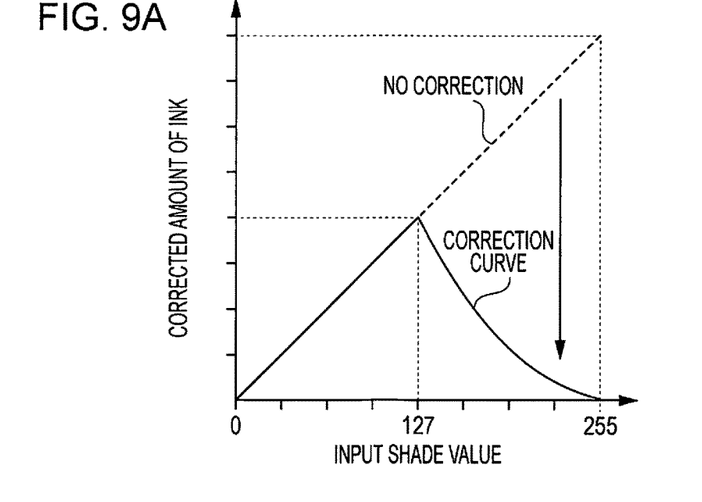
FIG. 9A is a graph illustrating the concept of correcting an ink ejection amount in Embodiment 2.
Figure 9B:
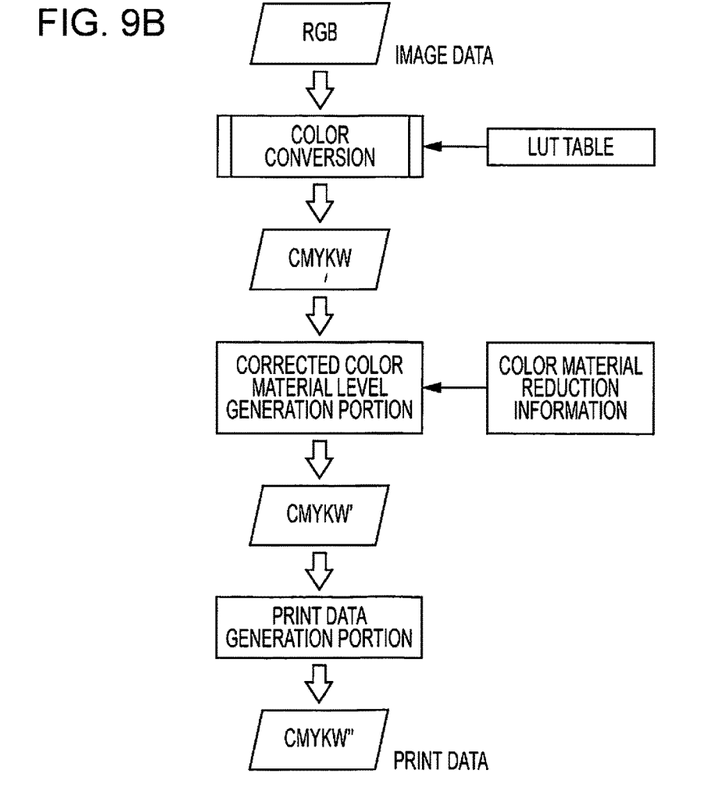
FIG. 9B is a flow chart illustrating the concept of correcting the ink ejection amount in Embodiment 2.

The graph in FIG. 9A and the flow chart in FIG. 9B illustrate the concept of correcting an ink ejection amount in Embodiment 2.

The graph in FIG. 9A illustrates an example of the relationship between the input shade value and the corrected ejection amount of an ink (hereinafter referred to as the corrected amount of the ink). In the illustrated correction curve, as an input shade value of 127 or above approaches 255, the corrected amount of the ink becomes 0. That is, the correction curve is a transfer function in which the input shade value and the corrected amount of the ink are associated. The corrected amount of the ink is determined by multiplying the amount of the ink prior to the correction by a correction coefficient determined by the transfer function.

That is, in the print data converted in the CMYKW-like color space, the ink ejection amount is corrected for the input shade value of each ink color. The transfer function (correction curve) for making the correction is preset for each ink color by a method similar to a method using the user interfaces described with reference to FIG. 7, or other methods.

The following describes the procedure of correcting ink ejection amounts. As the flow chart in FIG. 9B illustrates, like the conventional method, the color conversion processing is performed on image data in the RGB format with a LUT table to obtain data in the CMYKW-color like space. Subsequently, the obtained CMYKW(c, m, y, k, w) is converted into CMYKW(c', m', y', k', w') with which the corrected amounts of the inks are to be ejected. The ejection ink amounts can be reduced by printing in accordance with the print data in the CMYKW(c', m', y', k', w').

Advantageous effects similar to those of Embodiment 1 can be obtained also with the print data generation device, the printing apparatus, and the method of generating print data in the present embodiment.

It should be noted that the invention is not necessarily embodied by the above embodiments, and the above embodiments can be modified or improved in various ways. The following describes modification examples. Here, identical reference signs are used to designate the same structural elements as those in the above embodiments, and overlapping explanations are omitted.

Modification Example 1

In Embodiments 1 and 2, for instance, as FIG. 7 illustrates, the color material reduction information obtainment portion obtains the color material reduction information from the color material level reduction degree information and the predetermined color correction range information including the medium color information. However, the color material reduction information may be obtained in other ways.

Modification Example 1 is a modification of the print data generation device (PC 100) of the printing apparatus 1000. In the PC 100 in Modification Example 1, the color material reduction information obtainment portion allows the display unit 103 to display pre-generated corrected color material levels so that any of the pre-generated corrected color material levels is selectable.

The corrected color material levels are prepared. Specifically, the colors of the print medium 1 onto which printing is to be performed are limited to typical colors. For each color, the reduction degree of the ink is set to be, for example, three levels: high, intermediate, and low, and is evaluated by, for example, performing actual printing. Thus, corrected color material levels corresponding to the three levels are prepared. A printing apparatus manufacturer prepares the corrected color material levels corresponding to the evaluated three-level reduction degree for each typical color, and stores the corrected color material levels in the storage unit 104.

It should be noted that the user may prepare the corrected color material levels. In this case, the user stores the prepared corrected color material levels together with attribute information such as the color of the print medium 1 and the reduction degree of the ink, in the storage unit 104 so that selection can be made.

Figure 8:
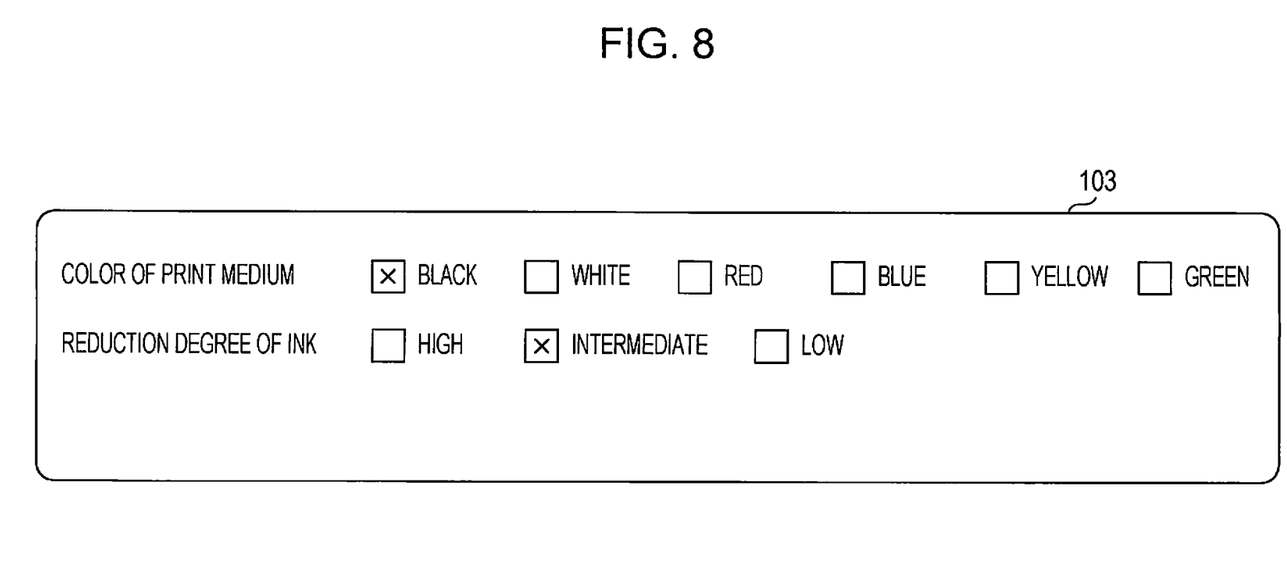
FIG. 8 is a display example of a screen in which selection is made from among corrected color material levels in Modification Example 1.

FIG. 8 is a display example of a screen in which selection is made from among the prepared corrected color material levels.

By selecting the color of the print medium 1 and the reduction degree of the ink, an appropriate corrected color material level can be selected from among the prepared corrected color material levels.

In the present modification example, any of the prepared corrected color material levels can be selected in accordance with the display of the display unit 103. Accordingly, corrected color material levels can be more easily generated. Here, the corrected color material levels are generated in any form such as a correction table or a function in which an output value for an input value is stored, and do not have to be generated in a particular form.

Modification Example 2

In Embodiments 1 and 2, the RGB color space is used as an example of the multidimensional display color space. However, the multidimensional display color space is not necessarily the RGB color space. Other examples of the multidimensional display color space may include L*a*b* color space and L*u*v* color space.

Modification Example 2 is a modification of the print data generation device (PC 100) of the printing apparatus 1000. The PC 100 in Modification Example 2 includes a display color space conversion portion that can interconvert image data in the RGB color space and image data in a multidimensional display color space different from the RGB color space. It is preferable that the PC 100 include the display color space conversion portion, for example, as a functional portion of the printer driver.

In the present modification example, it is possible to generate print data from which the advantageous effects described above can be similarly obtained on the basis of color information on the print medium 1 and image data in a multidimensional display color space different from the RGB color space.

The entire disclosure of Japanese Patent Application No. 2015-085675, filed Apr. 20, 2015 is expressly incorporated by reference herein.

What is claimed is:

1. A print data generation device that generates print data to be used in printing a color material onto a print medium on the basis of image data, the print data generation device comprising:
   a medium color obtainment portion that obtains color information indicating color of the print medium;
   a display unit that displays a user interface for designating color material reduction information, the color material reduction information being information that designates a color material level reduction degree of shade values in a predetermined color format within a predetermined color correction range that includes the color information in the predetermined color format, the predetermined color correction range including a shade value corresponding to the color of the print medium;
   an input unit through which information on the color material level reduction degree and the predetermined color correction range is designated by a user that views the user interface on the display unit;
   a color material reduction information obtainment portion that obtains the color material reduction information based on the information on the color material level reduction degree and the predetermined color correction range that is designated through the input unit by the user that views the user interface on the display unit;
   a corrected color material level generation portion that generates corrected image data in the predetermined color format for which the shade values in the predetermined color correction range have been corrected on the basis of the image data in the predetermined color format and the color material reduction information; and
   a print data generation portion that generates the print data on the basis of the corrected image data in the predetermined color format.

2. The print data generation device according to claim 1, further comprising a storage unit that stores the color material reduction information.

3. The print data generation device according to claim 1, wherein the display unit displays the print data generated by the print data generation portion.

4. The print data generation device according to claim 1, wherein the color material reduction information obtainment portion obtains the color material reduction information on the basis of a transfer function for correcting a shade value in the predetermined color correction range information, as the color material level reduction degree information.

5. The print data generation device according to claim 3, wherein the display unit displays a plurality of the corrected color material levels pre-generated such that any of the plurality of the corrected color material levels is selectable.

6. The print data generation device according to claim 1, further comprising a display color space conversion portion capable of interconverting the image data in a predetermined color space and image data in a space different from the predetermined color space.

7. A printing apparatus comprising the print data generation device according to claim 1.

8. A printing apparatus comprising the print data generation device according to claim 2.

9. A printing apparatus comprising the print data generation device according to claim 3.

10. A printing apparatus comprising the print data generation device according to claim 4.

11. A printing apparatus comprising the print data generation device according to claim 5.

12. A printing apparatus comprising the print data generation device according to claim 6.

13. A method of generating print data to be used in printing a color material onto a print medium on the basis of image data, the method comprising:

obtaining color information indicating color of the print medium;

displaying a user interface for designating color material reduction information on a display unit, the color material reduction information being information that designates a color material level reduction degree of shade values in a predetermined color format within a predetermined color correction range that includes the color information in the predetermined color format, the predetermined color correction range including a shade value corresponding to the color of the print medium;

obtaining color material reduction information based on information on the color material level reduction degree and the predetermined color correction range that is designated through an input unit by a user that views the user interface on the display unit;

generating corrected image data in the predetermined color format for which the shade values in the predetermined color correction range have been corrected on the basis of the image data in the predetermined color format and the color material reduction information; and generating the print data on the basis of the corrected image data in the predetermine color format.

* * * * *